United States Patent
Ludwig (10) Patent No.: US 9,127,944 B2
(45) Date of Patent: Sep. 8, 2015

(54) AVIONICS DISPLAY INTERFACE AND METHOD OF OPERATION

(75) Inventor: Patrick Ludwig, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 1141 days.

(21) Appl. No.: 12/852,108

(22) Filed: Aug. 6, 2010

(65) Prior Publication Data

US 2012/0032818 A1 Feb. 9, 2012

(51) Int. Cl.
*G01C 23/00* (2006.01)
*G06F 3/0482* (2013.01)
*G06F 3/0489* (2013.01)

(52) U.S. Cl.
CPC .............. *G01C 23/00* (2013.01); *G06F 3/0482* (2013.01); *G06F 3/0489* (2013.01); *Y10S 345/902* (2013.01)

(58) Field of Classification Search
CPC ..... G01C 23/00; G06F 3/0489; G06F 3/0482; Y10S 345/902
USPC ........................ 340/979, 971, 980, 945; 701/3
See application file for complete search history.

(56) References Cited

U.S. PATENT DOCUMENTS

| | | | |
|---|---|---|---|
| 5,842,142 A | 11/1998 | Murray et al. | |
| 6,128,553 A * | 10/2000 | Gordon et al. | 701/3 |
| 6,470,224 B1 * | 10/2002 | Drake et al. | 700/22 |
| 8,381,132 B2 * | 2/2013 | Muresan et al. | 715/840 |
| 2003/0006892 A1 * | 1/2003 | Church | 340/439 |

FOREIGN PATENT DOCUMENTS

| | | |
|---|---|---|
| EP | 0743580 | 11/1996 |
| EP | 2136276 | 12/2009 |

OTHER PUBLICATIONS

HP-35 Operating Manual, Hewlettpackard, 0035-9008 Rev Aug. 1973.*

* cited by examiner

*Primary Examiner* — Brian Zimmerman
*Assistant Examiner* — Sara Samson
(74) *Attorney, Agent, or Firm* — Fogg & Powers LLC (57) ABSTRACT

A method for operating a display unit such as an avionics display interface is provided. The method comprises displaying a plurality of logical categories of options available, with each of the logical categories including a plurality of items of information, selecting a first item of information in a first logical category when a first input key is pressed, and selecting a next item of information in the first logical category when the first input key is pressed again. The method further includes selecting a first item of information in a second logical category when a second input key is pressed, and selecting a next item of information in the second logical category when the second input key is pressed again.

17 Claims, 8 Drawing Sheets

AVIONICS DISPLAY INTERFACE AND METHOD OF OPERATION

BACKGROUND

A display unit such as a multipurpose control display unit (MCDU) is implemented as a user-interface in selected aircraft. The screen space is limited on a MCDU, requiring multiple page screens and keys to use the various functionalities provided by the MCDU. The additional pages and keys that the pilot must use require extra time that could be better used in other flight operations.

Conventional implementations for a MCDU require that a pilot navigate to a new screen or key-in required text using a keypad and line select key to select a direction. For example, in order to choose a direction type, the pilot must enter the desired direction (e.g., NW, NE, SOUTH, EAST . . . etc.) in a scratchpad memory, and then press a selected key to have the direction filled in on the screen. Alternatively, the pilot can click on a selected key, and then be taken to a new screen page where the desired direction can be selected. When the pilot selects the desired direction, the pilot is automatically returned to the previous screen page and the selected direction is filled in on the screen.

In certain situations, the MCDU requires significant reformulation of mission tasks in order to use features of automation, and an over-reliance on pilot memory to access the correct screen pages, as well as format and insert data. The reformulation of tasks and the reliance on memorized action sequences makes the operation of the automation difficult to train, increases pilot workload, and can result in significant errors.

SUMMARY

A method for operating a display unit such as an avionics display interface is disclosed herein. The method comprises displaying a plurality of logical categories of options available, with each of the logical categories including a plurality of items of information, selecting a first item of information in a first logical category when a first input key is pressed, and selecting a next item of information in the first logical category when the first input key is pressed again. The method further includes selecting a first item of information in a second logical category when a second input key is pressed, and selecting a next item of information in the second logical category when the second input key is pressed again.

BRIEF DESCRIPTION OF THE DRAWINGS

Features of the invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following description is, therefore, not to be taken in a limiting sense.

A method and system for operating an avionics display interface is described herein, which provide for large data structures to be organized in logical categories and displayed. The number of logical categories that can be employed is only limited by the maximum amount of space on the display.

In one embodiment, the present method and system can be implemented in an avionics display interface for choosing a compass direction. This allows a pilot to enter a desired direction easily on the same screen page of the display interface where other information is listed. In another embodiment, the present approach can be implemented in an avionics display interface for choosing a location.

The present method and system reduce pilot workload of making a selection on a display screen with a spatially limited human interface, such as a multipurpose control and display unit (MCDU). The present approach reduces pilot workload by efficiently organizing options on the display screen to minimize the number of menu navigations needed to make a selection.

Further details of the present method and system are described hereafter with reference to the drawings.

Figure 1:
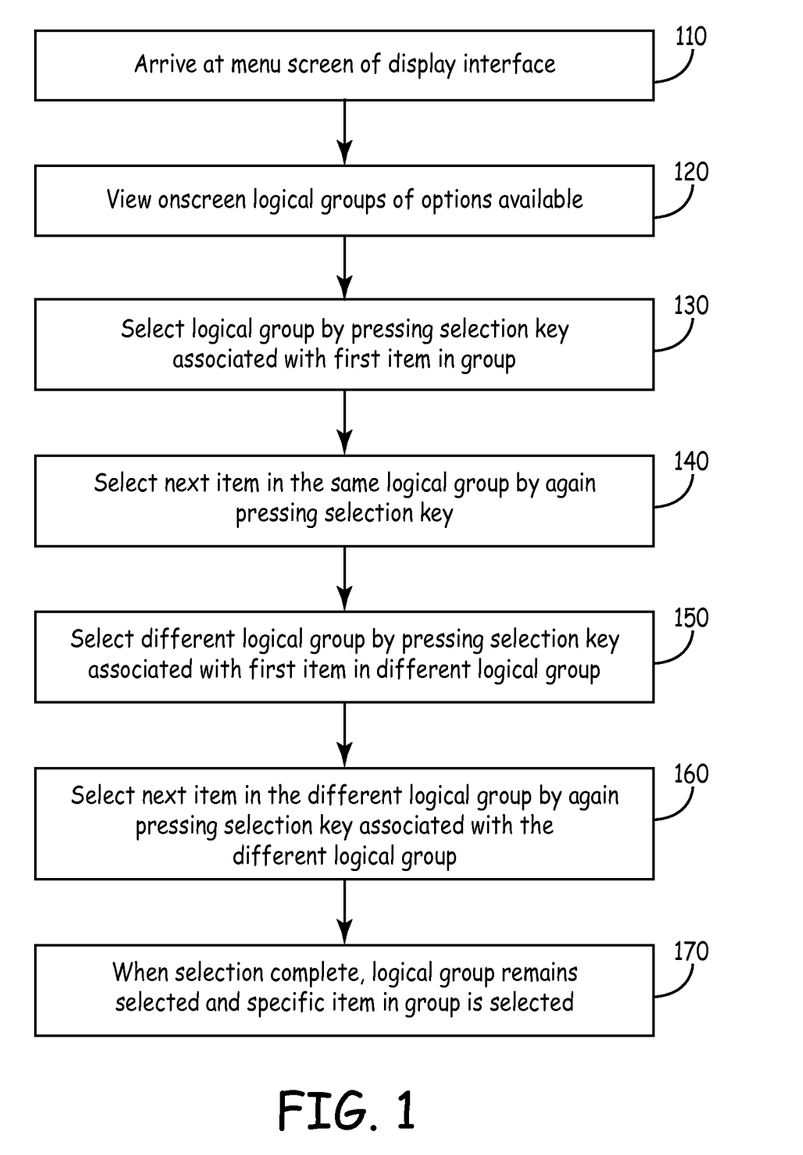
FIG. 1 is a flow diagram representing a method for operating an avionics display interface according to one approach.

FIG. 1 is a flow diagram representing a method for operating a display unit such as an avionics display interface according to one approach. Initially, a user arrives at a menu screen of the display interface (block 110), and views onscreen logical groups of options that are available (block 120). For example, the logical groups can include different categories of direction types. The user can select a logical group by pressing a selection key associated with a first item in the logical group shown on the display interface (block 130). The user can select the next item in the same logical group by again pressing the selection key (block 140). The user can select a different logical group by pressing a selection key associated with a first item in the different logical group (block 150). The user can select the next item in the different logical group by again pressing the key associated with the different logical group (block 160). When user selection is complete, the logical group remains selected and a specific item in the group is selected (block 170).

Figure 2:
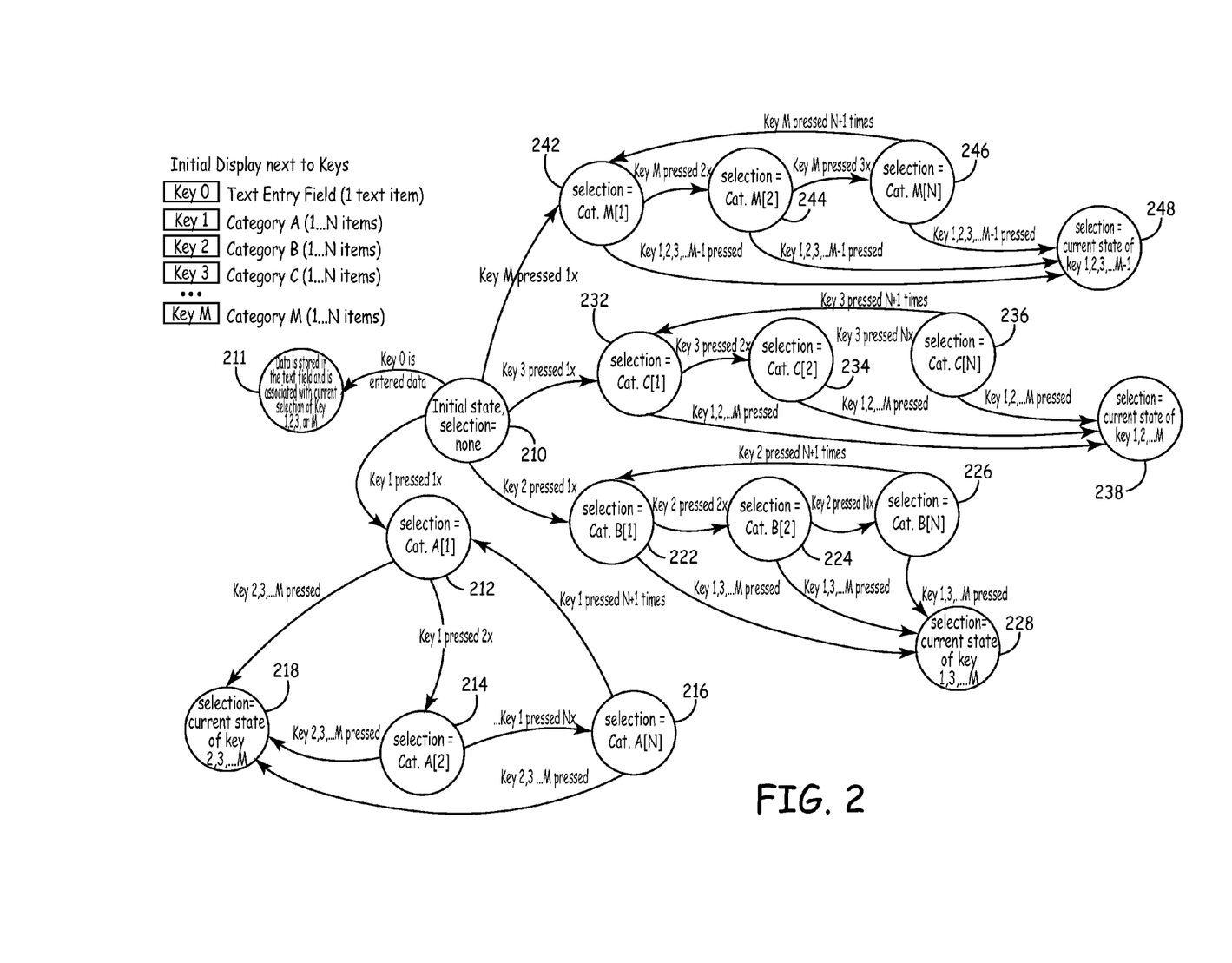
FIG. 2 is a state diagram representing a system for operating an avionics display interface according to one embodiment.

FIG. 2 is a state diagram representing a system for operating an avionics display interface having spatially and temporally efficient choice selection based on logical categories. The initial screen display next to respective push keys includes the following items:

Key 0—Text Entry Field (1 text item)
Key 1—Category A (1 . . . N items)
Key 2—Category B (1 . . . N items)
Key 3—Category C (1 . . . N items)
Key M—Category M (1 . . . N items)

In an initial state 210, no selection has been made. From the initial state 210, key 0 can be pressed to enter data, which is stored in a text field at 211 and is associated with a current selection of keys 1, 2, 3, or M.

When key 1 is pressed one time (1×) from the initial state 210, a first selection 212 is in category A[1]. When key 1 is pressed a second time (2×), a second selection 214 is in category A[2]. When key 1 is pressed N times (N×), a subsequent selection 216 is in category A[N]. When key 1 is pressed N+1 times, the selection is returned to category A[1] of first selection 212. When keys 2, 3, ... M are pressed after the first selection 212, the second selection 214, or the subsequent selection 216, a resulting selection 218 is the current state of keys 2, 3, ... M. In addition, if keys 2, 3 ... M are pressed, the value of key 1 retains its previously selected value (e.g., at selections 212, 214, 216, or 218), but is no longer selected.

When key 2 is pressed one time (1×) from the initial state 210, a first selection 222 is in category B[1]. When key 2 is pressed a second time (2×), a second selection 224 is in category B[2]. When key 2 is pressed N times (N×), a subsequent selection 226 is in category B[N]. When key 2 is pressed N+1 times, the selection is returned to category B[1] of first selection 222. When keys 1, 3, ... M are pressed after the first selection 222, the second selection 224, or the subsequent selection 226, a resulting selection 228 is the current state of keys 1, 3, ... M. In addition, if keys 1, 3 ,... M are pressed, the value of key 2 retains its previously selected value (e.g., at selections 222, 224, 226, or 228), but is no longer selected.

When key 3 is pressed one time (1×) from the initial state 210, a first selection 232 is in category C[1]. When key 3 is pressed a second time (2×), a second selection 234 is in category C[2]. When key 3 is pressed N times (N×), a subsequent selection 236 is in category C[N]. When key 3 is pressed N+1 times, the selection is returned to category C[1] of first selection 232. When keys 1, 2, ... M are pressed after the first selection 232, the second selection 234, or the subsequent selection 236, a resulting selection 238 is the current state of keys 1, 2, ... M. In addition, if keys 1, 2 ... M are pressed, the value of key 3 retains its previously selected value (e.g., at selections 232, 234, 236, or 238), but is no longer selected.

When key M is pressed one time (1×) from the initial state 210, a first selection 242 is in category M[1]. When key M is pressed a second time (2×), a second selection 244 is in category M[2]. When key M is pressed 3 times (3×), a third selection 246 is in category M[N]. When key M is pressed N+1 times, the selection is returned to category M[1] of first selection 242. When keys 1, 2, 3 ... M−1 are pressed after the first selection 242, the second selection 244, or the third selection 246, a resulting selection 248 is the current state of keys 1, 2, 3, ... M−1. In addition, if keys 1, 2, 3, ... M−1 are pressed, the value of key M retains its previously selected value (e.g., at selections 242, 244, 246, or 248), but is no longer selected.

Figure 3:
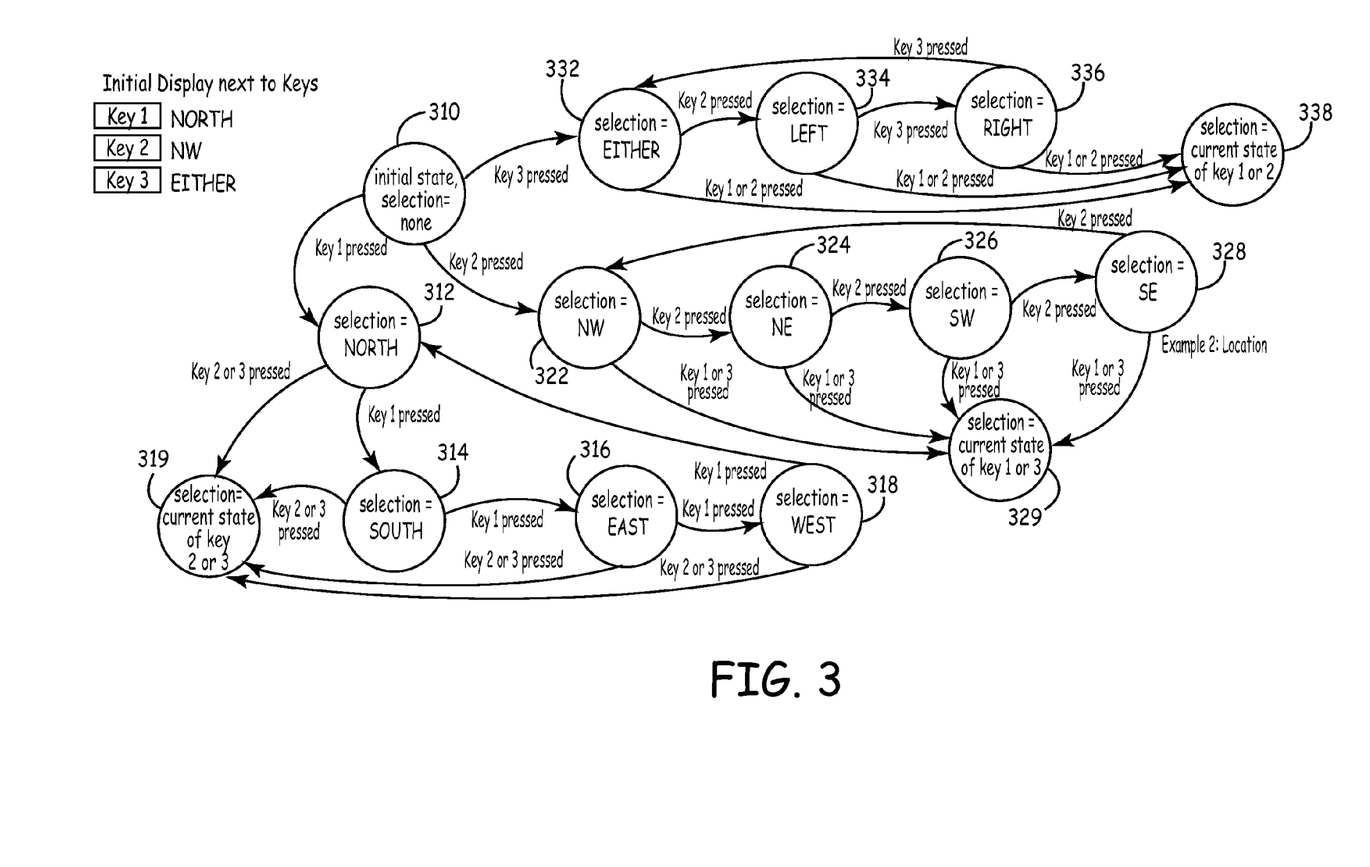
FIG. 3 is a state diagram representing a system for operating an avionics display interface for choosing direction type according to one embodiment.

In one embodiment, the present system allows the pilot to enter a desired direction easily on the same screen of the display unit where other information is listed. For example, FIG. 3 is a state diagram representing a system for operating an avionics display interface, which allows efficient choice selection of directions, including NORTH, SOUTH, EAST, WEST, NW (Northwest), NE (Northeast), SW (Southwest), SE (Southeast), LEFT, RIGHT, and EITHER (Left or Right). The initial screen display next to respective push keys can include the following items:

Key 1—NORTH
Key 2—NW
Key 3—EITHER

In an initial state 310, no selection has been made. When key 1 is pressed one time from the initial state 310, a first selection 312 is NORTH. When key 1 is pressed a second time, a second selection 314 is SOUTH. When key 1 is pressed a third time, a third selection 316 is EAST. When key 1 is pressed a fourth time, a fourth selection 318 is WEST. When key 1 is pressed again, the selection is returned to NORTH. When keys 2 or 3 are pressed after the first selection 312, the second selection 314, the third selection 316, or the fourth selection 318, a resulting selection 319 is the current state of keys 2 or 3. In addition, if keys 2 or 3 are pressed, the value of key 1 retains its previously selected value (e.g., at selections 312, 314, 316, 318, and 319), but is no longer selected.

When key 2 is pressed one time from the initial state 310, a first selection 322 is NW. When key 2 is pressed a second time, a second selection 324 is NE. When key 2 is pressed a third time, a third selection 326 is SW. When key 2 is pressed a fourth time, a fourth selection 328 is SE. When key 2 is pressed again, the selection is returned to NW. When keys 1 or 3 are pressed after the first selection 322, the second selection 324, the third selection 326, or the fourth selection 328, a resulting selection 329 is the current state of keys 1 or 3. In addition, if keys 1 or 3 are pressed, the value of key 2 retains its previously selected value (e.g., at selections 322, 324, 326, 328, and 329), but is no longer selected.

When key 3 is pressed one time from the initial state 310, a first selection 332 is EITHER. When key 3 is pressed a second time, a second selection 334 is LEFT. When key 3 is pressed a third time, a third selection 336 is RIGHT. When key 3 is pressed again, the selection is returned to EITHER. When keys 1 or 2 are pressed after the first selection 332, the second selection 334, or the third selection 336, a resulting selection 338 is the current state of keys 1 or 2. In addition, if keys 1 or 2 are pressed, the value of key 3 retains its previously selected value (e.g., at selections 332, 334, 336, and 338), but is no longer selected.

In other embodiments, the initial display next to keys 1, 2, or 3 can be different directions. For example, the initial display next to key 1 can be SOUTH, EAST, or WEST; the initial display next to key 2 can be NE, SW, or SE; and the initial display next to key 3 can be LEFT or RIGHT. The other directions can then be displayed by selecting the appropriate keys as described above.

Figure 4A:
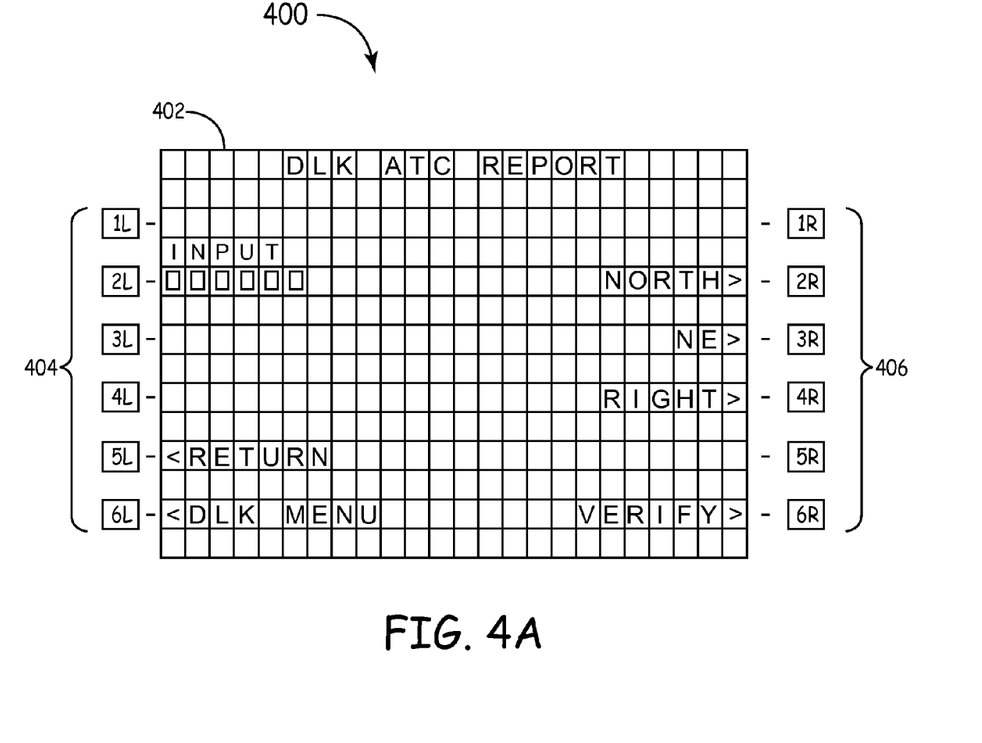
FIGS. 4A-4C are schematic depictions of a display unit having an avionics display interface for choosing a direction.
Figure 4B:
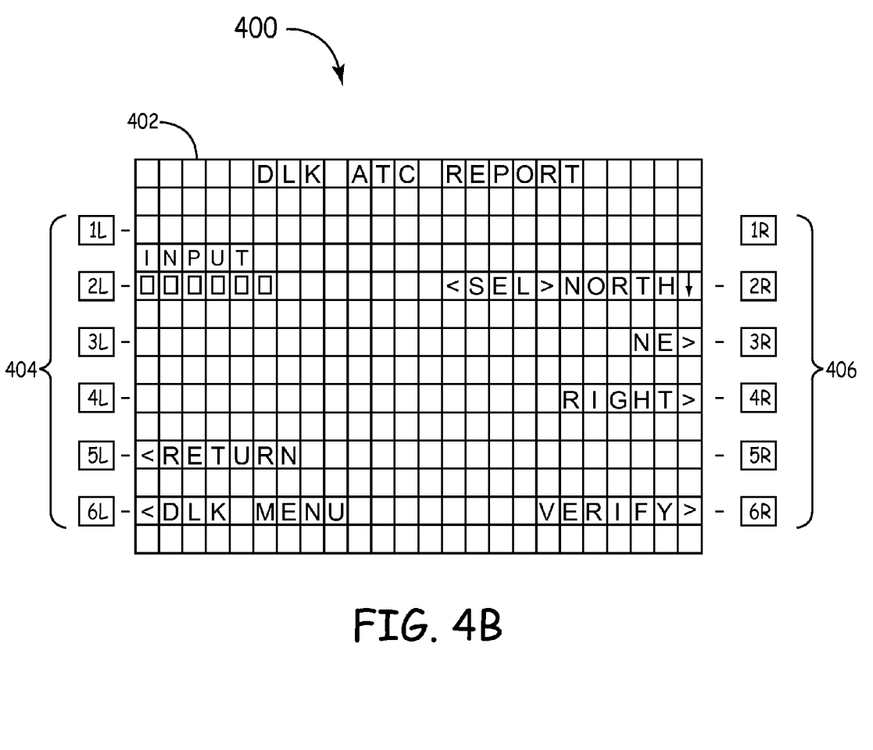
Figure 4C:
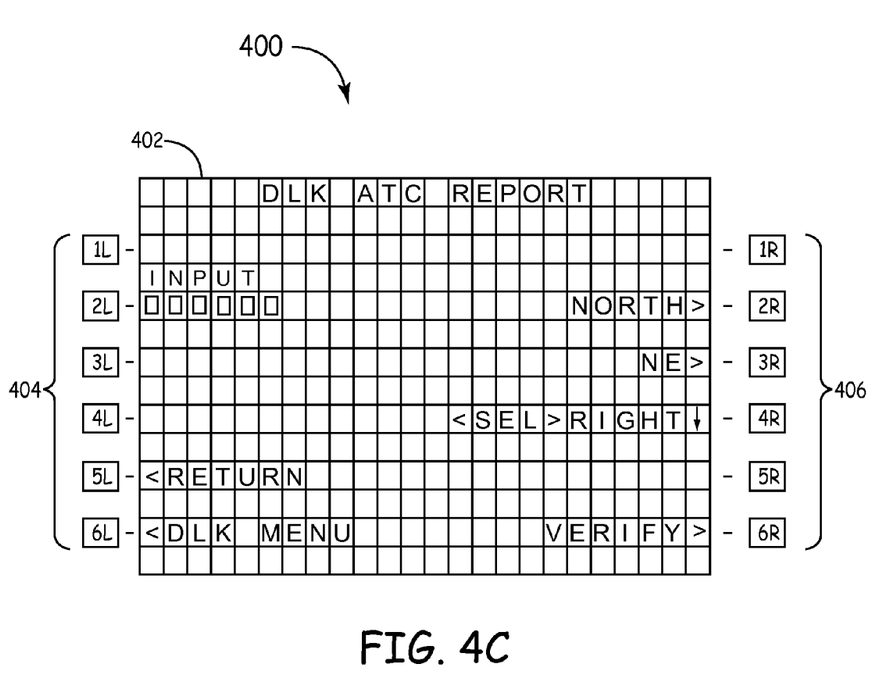

FIGS. 4A-4C depict an avionics display interface 400 such an MCDU for choosing direction type. The display interface 400 includes a display screen 402, a plurality of input keys 404 on the left side of screen 402, and a plurality of input keys 406 on the right side of screen 402. Each of the input keys can be associated with a particular onscreen selection line. The screen 402 is shown displaying an exemplary Data Link (DLK) Air Traffic control (ATC) REPORT having various selectable items.

For example, input keys 404 include a key 2L associated with a text INPUT that allows the user to input a message. A key 5L is associated with a RETURN selection, which allows the user to return to previous menus on the display screen. A button 6L is associated with a selection DLK MENU, which returns the user to a top level menu on the display screen. Other input keys 404 can be associated with other selectable items as desired.

The input keys 406 include various keys associated with onscreen selectable options. As shown, a key 2R is associated with an onscreen selection of NORTH, a key 3R is associated with an onscreen selection of NE, and a key 4R is associated with an onscreen selection of RIGHT. A key 6R is associated with the selection VERIFY, which allows the user to check a message for errors. FIG. 4A shows the onscreen selectable options in an unselected state.

As shown in Table 1, when a user presses key 2R one time (1×), the selection is NORTH. As the user presses key 2R successive times (2×, 3×, 4×), the selection scrolls through SOUTH, EAST, and WEST. If the user pushes key 2R again, the selection returns to NORTH. Likewise, the user can press key 3R successive times to scroll through NE, NW, SE, and SW. The user can also press key 4R successive times to scroll through RIGHT, LEFT, AND EITHER.

TABLE 1

| KEY 2R | KEY 3R | KEY 4R |
|---|---|---|
| NORTH (1x) | NE (1x) | RIGHT (1x) |
| SOUTH (2x) | NW (2x) | LEFT (2x) |
| EAST (3x) | SE (3x) | EITHER (3x) |
| WEST (4x) | SW(4x) | |

As shown in FIG. 4B, when a pilot presses key 2R to select NORTH, display screen 402 shows "<SEL>NORTH↓," next to key 2R. If the pilot presses key 2R multiple times, the display screen toggles to SOUTH, EAST, WEST, and NORTH again. This pattern of selection can be repeated by pressing key 2R multiple times as needed.

As shown in FIG. 4C, when a pilot presses key 4R to select RIGHT, display screen 402 shows "<SEL>RIGHT↓," next to key 2R. If the pilot presses key 4R multiple times, the display screen toggles to LEFT, EITHER, and RIGHT again. This pattern of selection can be repeated by pressing key 4R multiple times as needed.

Figure 5:
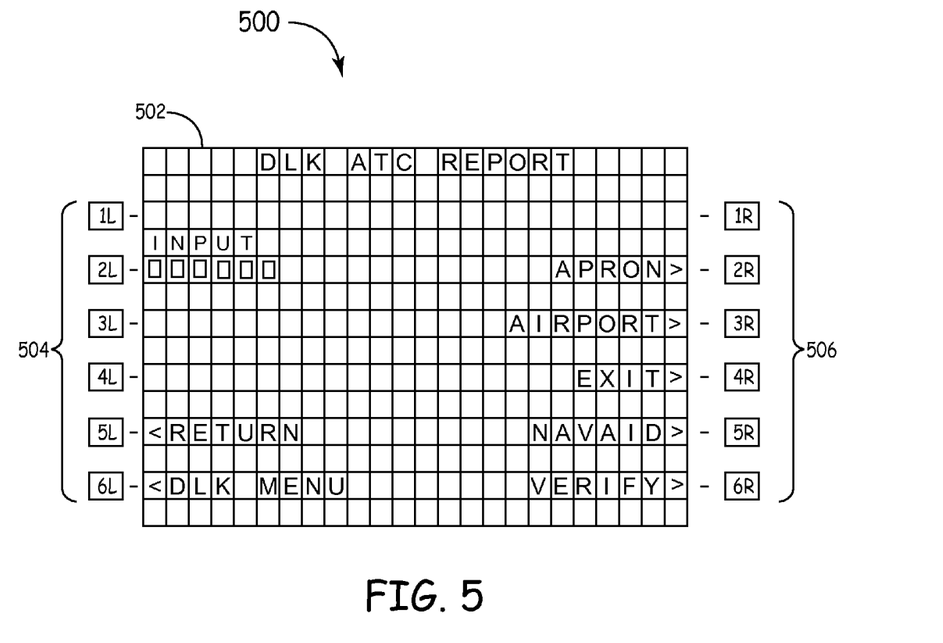
FIG. 5 is a schematic depiction of a display unit having an avionics display interface for choosing a location.

FIG. 5 illustrates an exemplary avionics display interface 500 such an MCDU, which is configured for choosing a location. The display interface 500 includes a display screen 502, a plurality of input keys 504 on the left side of screen 502, and a plurality of input keys 506 on the right side of screen 502. The input keys 504 include a key 2L associated with a text INPUT, a key 5L associated with a RETURN selection, and a button 6L associated with a selection DLK MENU. Other input keys 504 can be associated with other selectable items as desired.

The input keys 506 include various keys associated with onscreen selectable options related to choosing a location. As shown, a key 2R is associated with an onscreen selection of APRON, which is categorized with types of runways. A key 3R is associated with an onscreen selection of AIRPORT, and a key 4R is associated with an onscreen selection of EXIT. A key 5R is associated with an onscreen selection of NAVAID, which is categorized with types of air space locations. A key 6R is associated with the selection VERIFY.

As shown in Table 2, when a user presses key 2R one time (1×), the selection is APRON. As the user presses key 2R successive times (2×, 3×), the selection scrolls through RAMP and TOWER. If the user pushes key 2R again, the selection returns to APRON. Likewise, the user can press key 3R successive times to scroll through AIRPORT, DESTINATION AIRPORT, and DEPARTURE AIRPORT. The user can press key 4R successive times to scroll through EXIT and HIGHSPEED EXIT. The user can also press key 5R successive times to scroll through NAVAID, FIX, and LAT/LONG (latitude/longitude).

TABLE 2

| KEY 2R | KEY 3R | KEY 4R | KEY 5R |
|---|---|---|---|
| APRON (1x) | AIRPORT (1x) | EXIT (1x) | NAVAID |
| RAMP (2x) | DESTINATION AIRPORT (2x) | HIGHSPEED EXIT (2x) | FIX |
| TOWER (3x) | DEPARTURE AIRPORT (3x) | | LAT/LONG |

Figure 6:
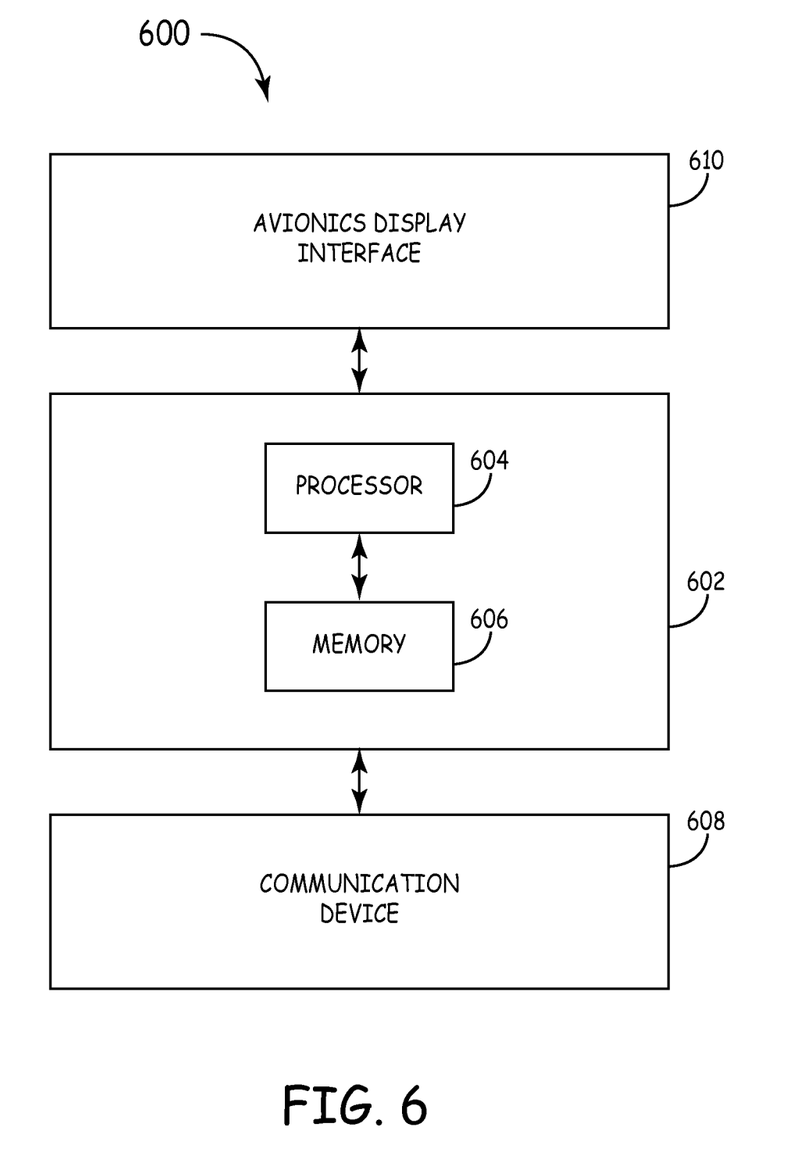
FIG. 6 is a block diagram of a computer system that can implement an avionics display interface.

FIG. 6 is a block diagram of a computer system 600 that can implement the present method and system for operating an avionics display interface. The computer system 600 can be implemented in a communication management function (CMF) of a communication management unit (CMU); in a flight management computer (FMC) such as an FMC hosting Controller Pilot Data Link Communication (CPDLC) applications; or in any other avionics computer in an aircraft. The present system and method can also be a part of the communication protocols for future air navigation system (FANS) CPDLC systems, or aeronautical telecommunication network (ATN) CPDLC systems.

The computer system 600 comprises a processing and storage platform 602, which includes at least one processor 604 and at least one memory device 606 in operative communication with processor 604. The computer system 600 can also incorporate a data communication device 608, to enable transmission and reception of various communications and data link messages such as CPDLC application messages. The data communication device 608 is in operative communication with platform 602. The computer system 600 also includes an avionics display interface 610, such as an MCDU.

The processor 604 can be implemented using software, firmware, hardware, or any appropriate combination thereof, as known to one of skill in the art. By way of example and not limitation, hardware components for processor 604 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In this exemplary embodiment, processor 604 includes or functions with software programs, firmware, or other computer readable instructions for carrying out various process tasks, calculations, and control functions, used in the present method. These instructions are typically tangibly embodied on any appropriate medium used for storage of computer readable instructions or data structures.

The memory device 606 can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disks (CD), Digital Video Discs (DVD), Blu-ray Discs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, and the like.

The present method can be implemented in computer readable instructions, such as program modules or applications, which are executed by a data processor. Generally, program modules or applications include routines, programs, objects, data components, data structures, algorithms, and the like, which perform particular tasks or implement particular abstract data types The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for operating a display unit for an aircraft, the method comprising:
    displaying a plurality of logical categories of options available on an avionics display screen of the display unit, each of the logical categories including a plurality of items of information associated with flight of the aircraft;
    selecting a first item of information in a first logical category when a first input key is pressed, the first item of information visible on the screen adjacent to the first input key;
    selecting a next item of information in the first logical category when the first input key is pressed again, the next item of information replacing the first item of information such that only the next item of information is visible on the screen adjacent to the first input key;
    selecting a first item of information in a second logical category when a second input key is pressed, the first item of information in the second logical category visible on the screen adjacent to the second input key; and
    selecting a next item of information in the second logical category when the second input key is pressed again, the next item of information in the second logical category replacing the first item of information in the second logical category such that only the next item of information in the second logical category is visible on the screen adjacent to the second input key;
    wherein when the second input key is pressed after selecting the first or next item of information in the first logical category with the first input key, the first or next item of information in the first logical category remains visible on the screen adjacent to the first input key but is no longer selected.

2. The method of claim 1, wherein the logical categories correspond to compass directions.

3. The method of claim 1, wherein the logical categories correspond to location information.

4. The method of claim 1, further comprising:
    selecting a first item of information in a third logical category when a third input key is pressed; and
    selecting a next item of information in the third logical category when the third input key is pressed again.

5. The method of claim 4, further comprising:
    selecting a first item of information in a fourth logical category when a fourth input key is pressed; and
    selecting a next item of information in the fourth logical category when the fourth input key is pressed again.

6. A method of operating an avionics display interface comprising a display screen and a plurality of input keys adjacent to the display screen, with each of the input keys associated with a separate text line on the display screen, wherein the method comprises:
    displaying a plurality of logical categories of options for presentation on the display screen, each of the logical categories including a plurality of items of information associated with flight of an aircraft that are presentable on the display screen;
    selecting a first item of information in a first logical category on the text line associated with a first input key when the first input key is pressed a first time;
    selecting one or more additional items of information in the first logical category on the text line associated with the first input key in place of the first item of information when the first input key is pressed one or more additional times;
    selecting a first item of information in a second logical category on the text line associated with a second input key when the second input key is pressed a first time;
    selecting one or more additional items of information in the second logical category on the text line associated with the second input key in place of the first item of information in the second logical category when the second input key is pressed one or more additional times;
    selecting a first item of information in a third logical category on the text line associated with a third input key when the third input key is pressed a first time; and
    displaying one or more additional items of information in the third logical category on the text line associated with the third input key in place of the first item of information in the third logical category when the third input key is pressed one or more additional times;
    wherein when the second input key is pressed after selecting the first or additional items of information in the first logical category with the first input key, the first or additional items of information in the first logical category remains visible on the display screen but is no longer selected;
    wherein when the third input key is pressed after selecting the second or additional items of information in the second logical category with the second input key, the second or additional items of information in the second logical category remains visible on the display screen but is no longer selected.

7. The method of claim 6, wherein the logical categories correspond to compass directions for flight of an aircraft.

8. The method of claim 6, wherein the logical categories correspond to location information for an aircraft.

9. The method of claim 6, wherein the items of information in the first logical category are selectable directions including north, south, east, and west.

10. The method of claim 6, wherein the items of information in the second logical category are selectable directions including northeast, northwest, southeast, and southwest.

11. The method of claim 6, wherein the items of information in the third logical category are selectable directions including left, right, and either.

12. A display unit for an aircraft, comprising:
    an avionics display screen;
    a plurality of input keys adjacent to the display screen, each of the input keys associated with a separate text line on the display screen;
    at least one processor; and
    at least one memory device operatively coupled to the processor, the memory device comprising a computer readable medium having executable instructions stored thereon to:
        display a plurality of logical categories of options available on the screen, each of the logical categories including a plurality of items of information associated with flight of the aircraft;

select a first item of information in a first logical category when a first input key is pressed, the first item of information visible on the screen adjacent to the first input key;
select a next item of information in the first logical category when the first input key is pressed again, the next item of information replacing the first item of information such that only the next item of information is visible on the screen adjacent to the first input key;
select a first item of information in a second logical category when a second input key is pressed, the first item of information in the second logical category visible on the screen adjacent to the second input key; and
select a next item of information in the second logical category when the second input key is pressed again, the next item of information in the second logical category replacing the first item of information in the second logical category such that only the next item of information in the second logical category is visible on the screen adjacent to the second input key;
wherein when the second input key is pressed after the first or next item of information in the first logical category is selected with the first input key, the first or next item of information in the first logical category remains visible on the screen adjacent to the first input key but is no longer selected.

13. The display unit of claim 12, wherein the display screen is coupled to an avionics computer system.

14. The display unit of claim 12, wherein the avionics computer system comprises a communication management function, a communication management unit, or a flight management computer.

15. The display unit of claim 12, wherein the logical categories correspond to compass directions.

16. The display unit of claim 12, wherein the logical categories correspond to location information.

17. The display unit of claim 12, wherein the computer readable medium has further executable instructions stored thereon to:
  select a first item of information in a third logical category when a third input key is pressed; and
select a next item of information in the third logical category when the third input key is pressed again.

* * * * *